No. 691,290. Patented Jan. 14, 1902.
C. W. PERKINS.
TANK FOR MEDICATING WATER.
(Application filed May 20, 1901.)

(No Model.)

Witnesses

Inventor
Charles W. Perkins
By his Attorney

UNITED STATES PATENT OFFICE.

CHARLES W. PERKINS, OF ST. LOUIS, MISSOURI.

TANK FOR MEDICATING WATER.

SPECIFICATION forming part of Letters Patent No. 691,290, dated January 14, 1902.

Application filed May 20, 1901. Serial No. 61,156. (No model.)

*To all whom it may concern:*

Be it known that I, CHARLES W. PERKINS, a citizen of the United States, residing at St. Louis, State of Missouri, have invented certain new and useful Improvements in Tanks for Impregnating and Medicating Water, of which the following is a full, clear, and exact description, reference being had to the accompanying drawings, forming a part hereof.

My invention has relation to improvements in tanks for medicating water; and it consists in the novel arrangement and combination of parts, more fully set forth in the specification and pointed out in the claims.

Figure 1:
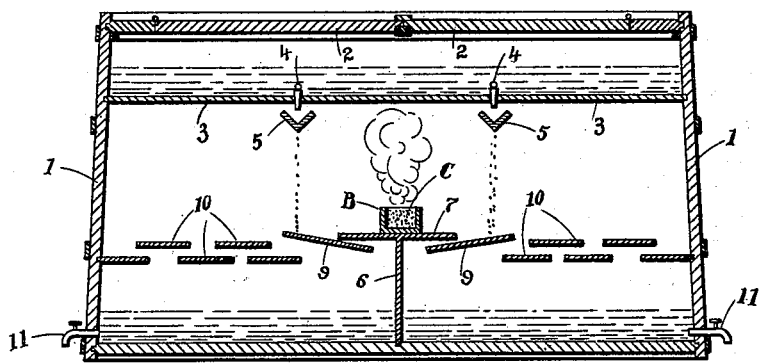
Figure 2:
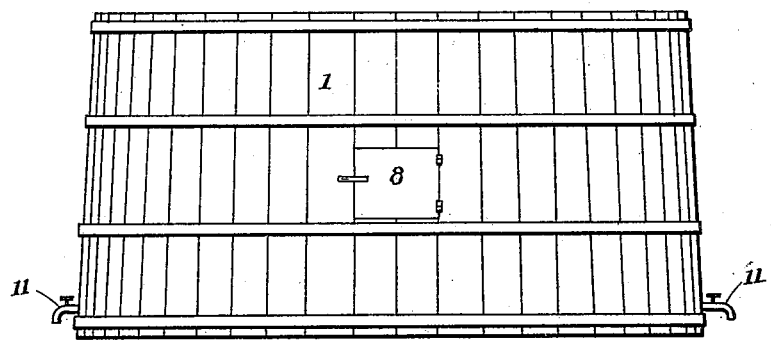
Figure 3:
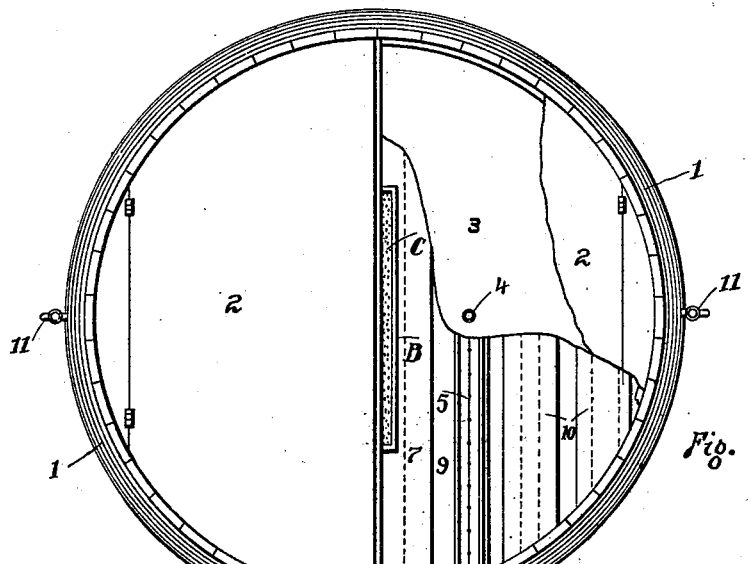

In the drawings, Figure 1 is a middle vertical transverse section of the device. Fig. 2 is a front elevation thereof, and Fig. 3 is a top plan with a portion of one of the lids and the bottom of the cold-water basin broken away to show interior of the main chamber.

The object of my invention is to construct a tank or retort in which the vapors rising from the slow combustion of certain medical compositions are caused to impregnate pure water to impart to the latter certain curative properties, whereby the water so impregnated may be used for medicinal purposes.

In detail the invention may be described as follows:

Referring to the drawings, 1 represents a tank of suitable proportions made of wood or cement, the same being provided with top lids 2. Disposed at a suitable distance below the upper edge thereof is a floor 3, forming the roof of the main chamber of the tank and at the same time the bottom of a cold-water compartment or basin, into which the pure water is initially introduced. The floor 3 is provided with openings closed temporarily by plugs 4, which when withdrawn permit the water to run into V-shaped troughs 5, having bottom perforations to allow the water to drip from them through the chamber of the tank. The bottom of the latter is divided into two compartments by a division-wall 6, at the top of which is disposed a platform 7 on a level with the bottom of a manhole closed by a gate 8. On each side of and below the opposite longitudinal edges of the platform 7 are disposed inclined plates 9, allowing the water which drips from the troughs 5 to be caught and delivered in sheets to the bottom of the tank. Between the inclined plates 9 and the wall of the tank are disposed a series of parallel overlapping deflecting-plates 10 for a purpose to presently appear, the water at the bottom of the tank being withdrawn through faucets 11.

Inserted into the tank through the manhole and allowed to rest on the platform 7 is an open box B, lined with asbestos, into which has been previously placed an intimate mixture of approximately ten pounds of flowers of sulfur, one and one-half pounds of powdered nitrate of soda, and one pound of powdered chlorate of potash. This mixture is ignited, the door 8 is closed, and the mixture allowed to burn slowly within the tank. The products of combustion and vapors rising from the box encounter the particles of water dripping from the troughs 5 and impregnate the water, the latter further dissolving such vapors after reaching the bottom of the tank. During the combustion of the mixture referred to naturally more or less quantity of solid particles will be mechanically carried upward by the rising vapors, and to prevent this sediment from landing on the medicated water at the bottom of the tank I employ the deflecting-plates 10 to intercept such solid particles, the water finding its way to the bottom of the tank. The water thus becomes charged and fully impregnated with the vapors while it is split up into small particles and while the latter are in motion. To secure the best results, the water in the basin on top of the floor 3 is kept cool, and in the summer-time a certain quantity of ice is introduced thereinto, so that the temperature may not rise above 40° Fahrenheit, practice demonstrating that cool water will combine to better advantage with the vapors aforesaid.

It is to be understood, of course, that I may depart in a measure from the details herein shown without affecting the nature or spirit of my invention.

Having described my invention, what I claim is—

1. In a device of the character described, a suitable tank, a water-basin above the same, plugs at the bottom of the basin, troughs located below the plugs, the bottoms of the troughs being perforated, a vertical division-wall at the base of the tank, means for supporting a suitable vapor-generating compound above said division-wall, inclined plates on each side of the faces of the vertical division-wall, located below the troughs, and a series of deflecting-plates between the inclined plates and the inner walls of the tank, substantially as set forth.

2. In a device of the character described, a suitable tank, a water-basin above the same, plugs at the bottom of the basin, troughs located below the plugs, the bottoms of the troughs being perforated, a vertical division-wall at the base of the tank, a platform on said division-wall for the support of a vapor-generating compound, inclined plates on each side of the longitudinal edges of the platform located below the troughs, and overlapping deflecting-plates between the inclined plates and the inner walls of the tank, the parts operating substantially as and for the purpose set forth.

In testimony whereof I affix my signature in presence of two witnesses.

CHARLES W. PERKINS.

Witnesses:
EMIL STAREK,
G. L. BELFRY.